United States Patent [19]
Dale

[11] Patent Number: 5,523,982
[45] Date of Patent: Jun. 4, 1996

[54] COMMUNICATION APPARATUS

[76] Inventor: Jeremy N. Dale, 35, Greystock Avenue, Fulwood, Preston, Lancashire PR2 9QN, England

[21] Appl. No.: 414,192

[22] Filed: Mar. 31, 1995

[30] Foreign Application Priority Data

Apr. 15, 1994 [GB] United Kingdom .................... 9407454

[51] Int. Cl.$^6$ ................................................ H04B 11/00
[52] U.S. Cl. ............................................ 367/131; 367/134
[58] Field of Search ...................................... 367/131, 132, 367/133, 134, 910; 114/315

[56] References Cited

U.S. PATENT DOCUMENTS

| | | | |
|---|---|---|---|
| 3,909,773 | 9/1975 | Saltzer | 367/131 |
| 3,995,578 | 12/1976 | McCullough | 114/315 |
| 5,010,529 | 4/1991 | Maynus | 367/131 |
| 5,136,555 | 8/1992 | Gardos | 367/901 |
| 5,331,602 | 7/1994 | McLaren | 367/134 |

*Primary Examiner*—Daniel T. Pihulic
*Attorney, Agent, or Firm*—Richard E. Jenkins

[57] ABSTRACT

The invention relates to diver-to-diver communication apparatus. There is provided a communication apparatus (2) for diver to diver communication, the apparatus comprising a waterproof casing (4), power supply means (52), ultra acoustic transmission means (72), ultra acoustic reception means (72, 74), control means (56) for the ultra acoustic transmissions, monitoring means (56) for the ultra acoustic reception, and means (16) to actuate the transmission means (72); whereby upon actuation of the transmission means (72) a predetermined signal is transmitted by the transmission means (72) suitable for reception by the reception means (72, 74) of another diver using similar apparatus (2).

22 Claims, 5 Drawing Sheets

COMMUNICATION APPARATUS

FIELD OF THE INVENTION

The present invention relates to communication apparatus and more particularly, though not exclusively, to communication apparatus for diver to diver communication.

BACKGROUND TO THE INVENTION

Scuba ("self-contained under water breathing apparatus") diving is becoming an ever more popular pursuit. In addition, its commercial applications are becoming more extensive and varied. However, it is appreciated that there is an element of risk in scuba diving and, indeed, many of the training courses available accentuate the safety aspects of the pursuit. It has, therefore, become well established to use the so-called "buddy" system in which divers dive in pairs so that, at all times, they have someone to turn to in the event of an emergency. For instance, if one diver's breathing apparatus becomes faulty, he can share the air of the other diver using well established procedures.

However, the "buddy" system relies upon the fact that the two divers can, in some way, communicate with each other. Normally, the communication is carried out by a series of agreed hand signals or using an underwater writing slate. This system of communication suffers from the disadvantage that it relies almost entirely upon the divers remaining within sight of each other. Where the water is unclear, for instance around the British Isles or if a wreck is being dived, unless great care is taken divers can often loose sight of each other which can result in the effective breakdown of the "buddy" system and a substantial increase in the inherent risk involved. However this danger has been recognised for some years and a number of proposals have been put forward in an attempt to overcome the problem.

United Kingdom patent application number GB 2 133 599 discloses a monitoring system for divers in which ultra acoustic signals are transmitted continuously on a predetermined frequency to a monitoring station provided on a surface escort vessel. The system generates a periodic test signal which has to be acknowledged by the diver. If no response signal is generated, the frequency of the transmission signals is increased and an alarm is generated in the monitoring station. However, this system requires there to be a third party involved in the monitoring and does not, in particular, enhance the reliability or safety of the "buddy" system. Further, although it is an expensive system to operate, it provides only an emergency signal.

Proposals have been put forward for voiced communication between two or more scuba divers. However, such a system is expensive and complicated. It needs to enable the diver to speak relatively clearly and be able to breathe which requires modifications to the standard breathing apparatus and also complex signalling systems to deal with voiced transmissions. No such voiced communication system has, in practice, established itself in the market place.

It is an object of the present invention to provide a novel and inventive communication apparatus for diver to diver communication.

SUMMARY OF THE INVENTION

According to the present invention, there is provided a communication apparatus for diver to diver communication, the apparatus comprising a waterproof casing, power supply means, ultra acoustic transmission means, ultra acoustic reception means, control means for the ultra acoustic transmissions, monitoring means for the ultra acoustic reception, and means to actuate the transmission means; whereby upon actuation of the transmission means a predetermined signal is transmitted by the transmission means suitable for reception by the reception means of another diver using similar apparatus.

Suitably, the casing encloses the other parts of the apparatus.

The communication can be non-verbal.

Normally, the predetermined signal will be one of a plurality of possible predetermined signals.

Conveniently, the ultra acoustic transmission means and the ultra acoustic reception means each comprise a transducer and, preferably, one transducer for both reception and transmission. Preferably the transducer is located in a shaped casing to refract the transmitted ultra acoustic waves. Conveniently, the casing has a curved surface and, more conveniently, is generally hemicylindrical. Such a shaped casing provides a wider area of transmission of signals than a planar casing.

Suitably, the communication apparatus comprises an attention mode in which a predetermined ultra acoustic attention signal is transmitted, which attention signal upon receipt by a similar communication apparatus results in the production of an alert attention signal. Suitably, the attention alert signal will be an audio signal.

Normally the attention signal will only be responded to by an appropriately addressed similar apparatus. Suitably the attention signal is accompanied, normally preceded, by an addressing signal. Suitably the apparatus further comprises an address switch or address switches. Conveniently the attention signal is only responded to by a similar apparatus addressed by its address switch or switches in the same way.

Suitably, means are provided for emitting an ultra acoustic emergency signal which is responded to by all similar apparatus. A visible distress signal, such as a light beacon, may be used in conjunction with the ultra acoustic emergency signal.

Conveniently the emergency signal requires the actuation of two distinct switches for activation. Preferably manual actuation is required.

Suitably, the apparatus further comprises means for transmitting an ultra acoustic finder signal which finder signal is responded to by a similar apparatus by the emission of an ultra acoustic locator signal.

Preferably, the apparatus further comprises measuring means to determine whether the apparatus is nearer to the transmitted locator signal in relation to its distance determined from a previously received locator signal.

Suitably, the measuring means comprises means to generate a clock pulse, means to measure the number of clock pulses between the transmission of a finder signal and the receipt of a locator signal, means to calculate whether the number of clock pulses in less than, the same as or more than the number of clock pulses measured during the previous cycle of finder signal transmission and locator signal transmission and means to communicate the results. Normally the communication means will comprise an audio sounder.

The power supply means can, suitably, comprise a rechargeable battery and, preferably, means to recharge the battery in situ from an external source.

The apparatus may further comprise means to attach the apparatus to a diver, for instance to a forearm, waist or belt.

Suitably the switches of the apparatus comprise Hall effect switches which do not require the integrity of the casing to be compromised.

Ultra acoustic signals are outside normal human hearing range. Frequencies between 30 kHz–100 kHz, could be used, although about 40 kHz is the preferred frequency at this time.

The invention also includes within its scope a diver to diver communication apparatus comprising a communication apparatus as referred to in the preceding paragraphs.

BRIEF DESCRIPTION OF THE DRAWINGS

The present invention will now be described, by way of example only, with reference to the drawings that follow; in which.

DESCRIPTION OF THE PREFERRED EMBODIMENT

Figure 1:
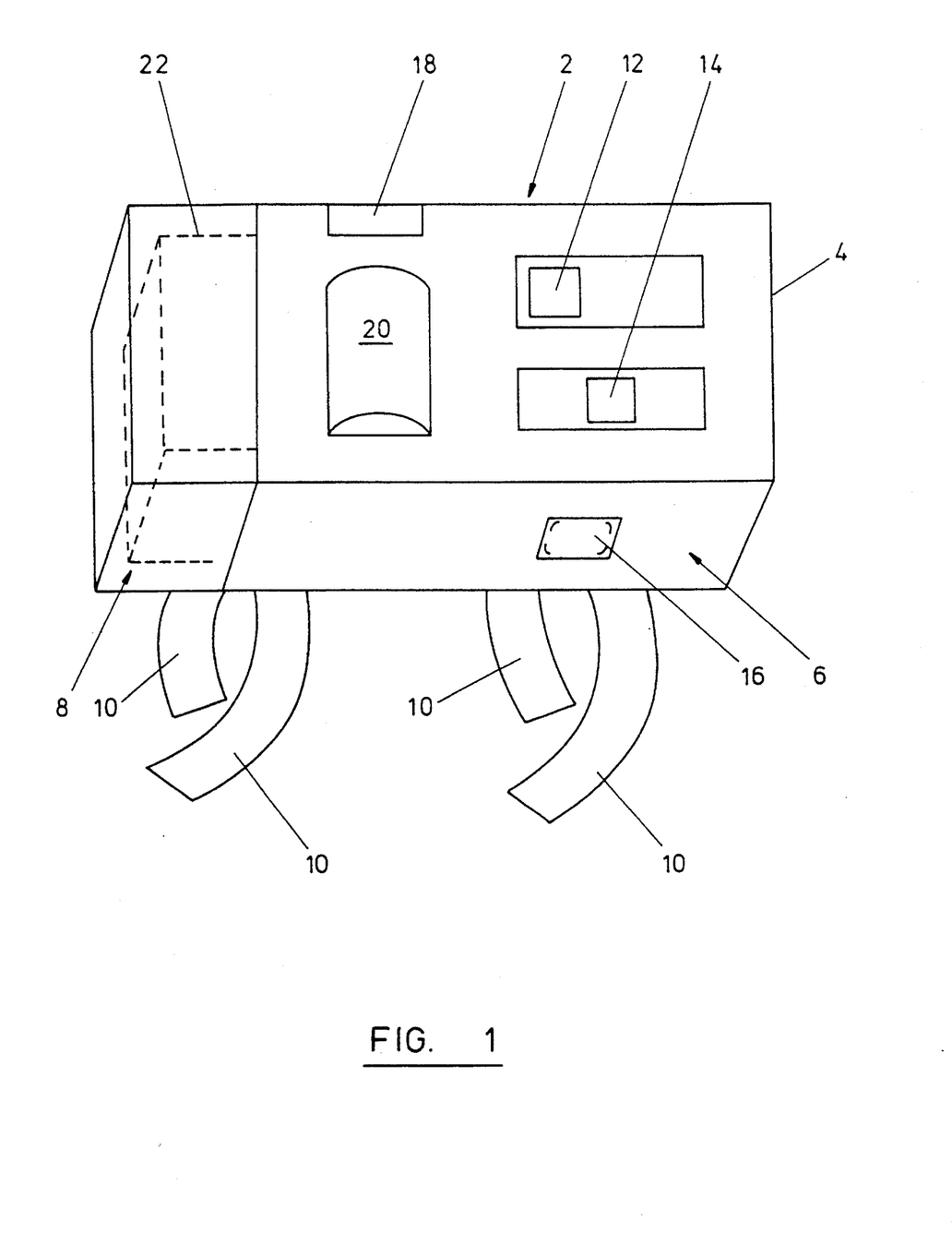
FIG. 1 is a schematic perspective view of a communication apparatus in accordance with the present invention.
Figure 2:
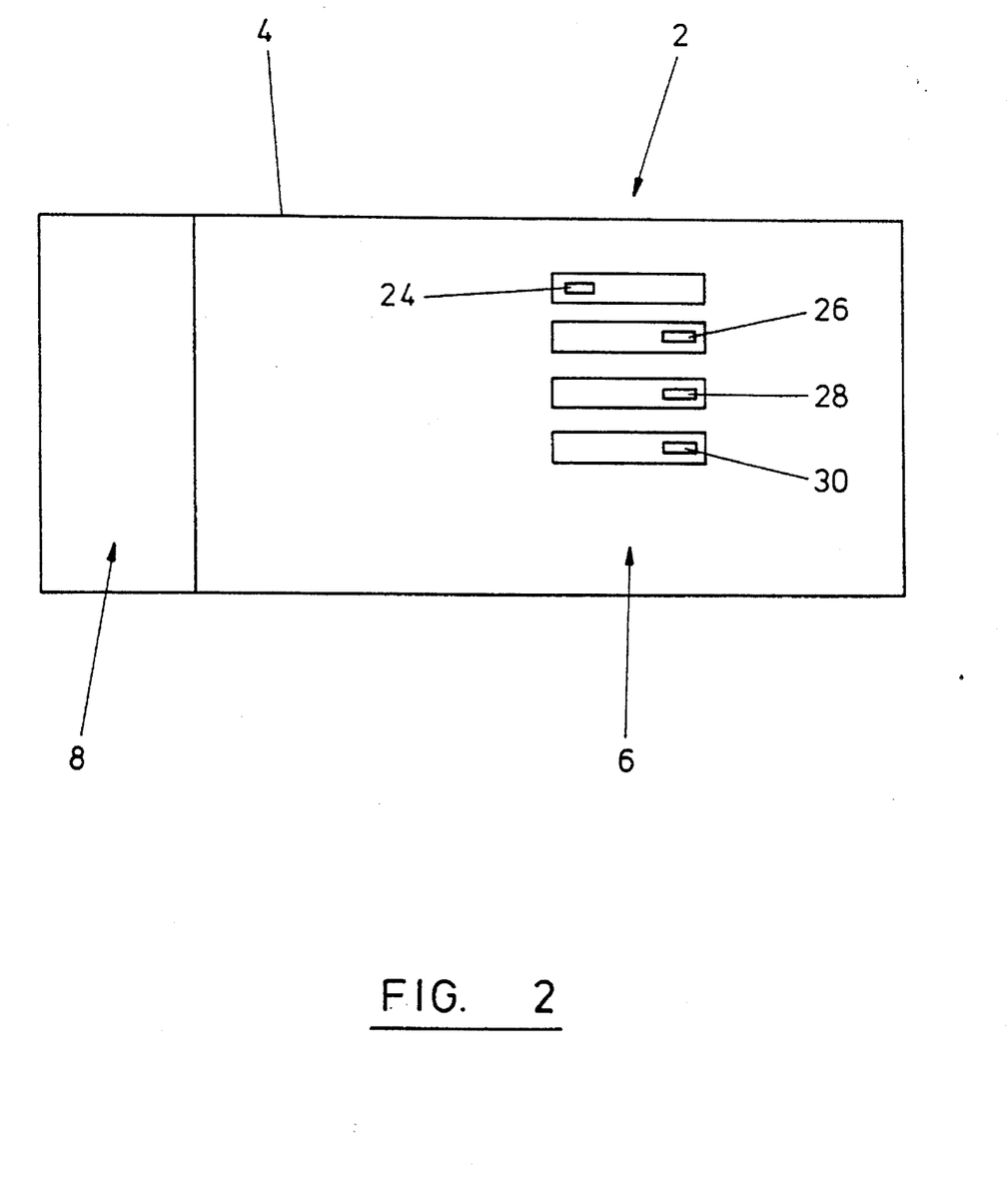
FIG. 2 is a schematic reverse plan view of the communication apparatus shown in FIG. 1.

Referring to FIGS. 1 and 2 of the drawings, there is shown a communication apparatus 2 for diver to diver communication. The communication apparatus 2 comprises a waterproof casing 4 having an opaque section, indicated generally by reference numeral 6, and a transparent or translucent section, indicated generally by reference numeral 8.

Attached to and extending from the casing 4 are straps 10 (shown only in FIG. 1 to aid clarity). In this case, the straps 10 include VELCRO (trade mark) strips (not shown) to enable them to be attached to each other and they are of a length suitable for the apparatus 2 to be attached to a diver's forearm. Alternatively a buckle can be used and/or the apparatus can be attached to a waist belt or to a diver's arm.

In the exterior of the opaque section 6 of the casing 4 are located two slider switches 12, 14. The switch 12 is a reed switch. The switch 14 is a Hall effect switch. Both switches 12, 14 require positive action to be moved to change their state. The switch 12 has two operative switch positions, one at either end of its travel and "locks" into its ON and OFF position. The switch 14 has three operative switch positions, one at either end of its travel and one in the centre. Switch 14 "locks" into one (finder) position at one end of its travel and is spring loaded to allow momentary activation at the other end position (attention) of its travel.

Referring to FIG. 1 of the drawings there is shown a push-to-make switch 16. Another switch 16 is located in a similar position on the opposite side face of the casing 4.

Also shown in FIGS. 1 and 2 of the drawings is a charging point 18 and a shaped part of the casing 20 which is generally hemicylindrical.

Within the transparent or translucent section 8 is a xenon beacon 22. A suitable xenon beacon would be a xenon flash tube, such as OPTUM U104A available from Maplin Electronics - PO Box 3, Rayleigh, Essex, SS6 8LR United Kingdom.

On the reverse side of the casing 4, shown in FIG. 2 of the drawings, are four Hall effect slider switches 24, 26, 28, 30 each of which is substantially similar to switch 12.

Figure 3:
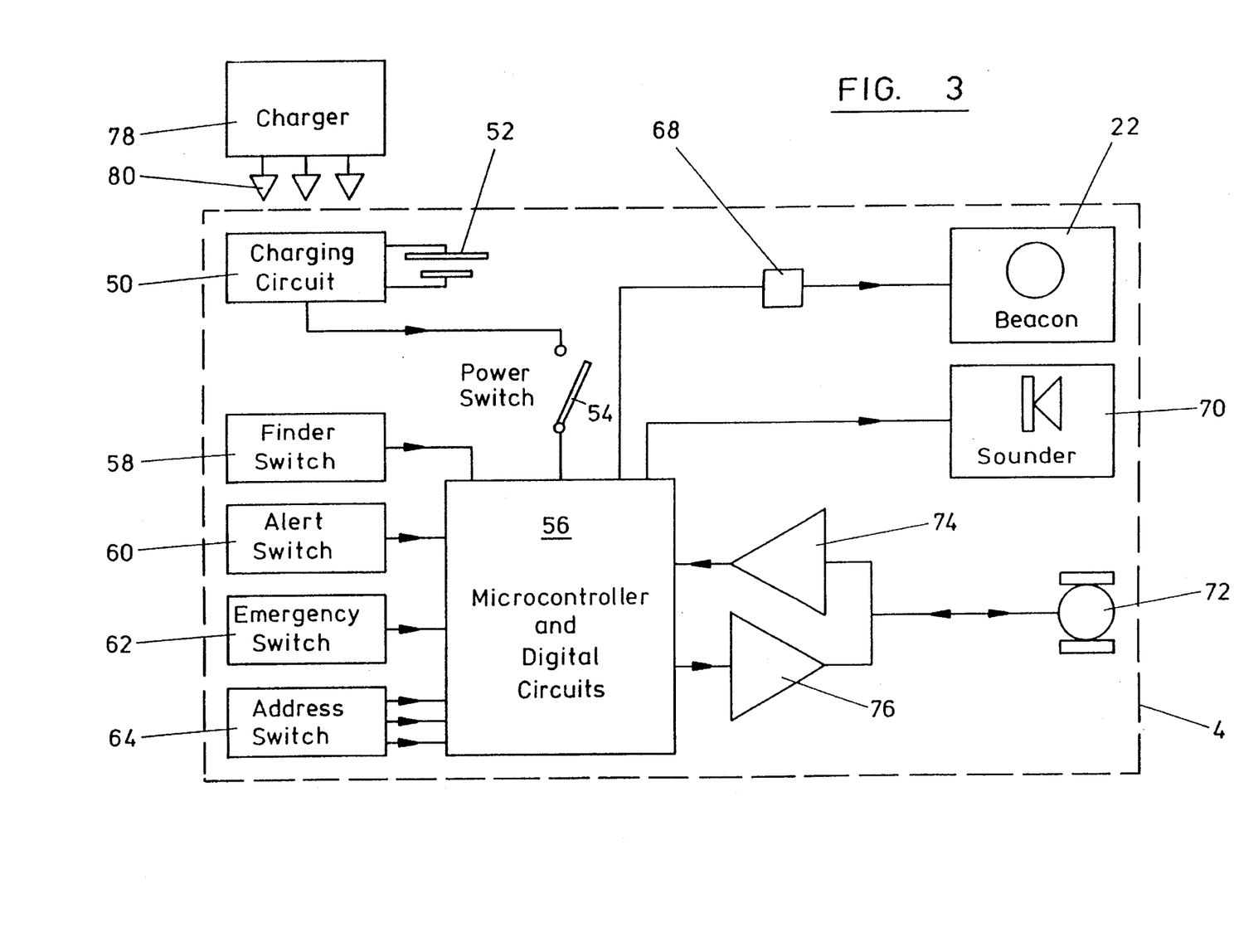
FIG. 3 is a hardware block diagram of circuitry and apparatus for the communication apparatus shown in FIGS. 1 and 2.

Referring now to FIG. 3 of the drawings, there is shown, using dashed lines, the waterproof casing 4. Within the casing 4 there is located a charging circuit 50 connected to a rechargeable battery 52, which together comprise power supply means. The battery 52 is a nickel-hydride battery. A nickel-cadmium or rechargeable lithium battery could be used, but are less desirable because of its less flavourable power to weight ratio and also because of the space it would occupy. The charging circuit 50 is also connected to a power switch 54. The charging circuit 50 can be any of those well known in the art.

Power switch 54 is connected to the power input of a microcontroller (including digital circuits) 56. The microcontroller 56 is an ST6225 (surface mounted) available from SGS Thomson Microelectronics, Planar House, Parkway, Globe Park, Harlow, Bucks United Kingdom appropriately programmed. Many alternatives are available, such as the Arizona P/C 16. Inputs of the microcontroller 56 are connected to a finder switch 58, an alert switch 60 and to an emergency switches 62. Further inputs of the microcontroller 56 are connected to four binary address switches 64.

The xenon beacon 22 is connected to an output of the microcontroller 56 via a voltage step-up means 68 of well known design. An audio sounder 70 is connected to another output of the microcontroller 56.

An ultra acoustic transducer 72 is connected to the input of a receiver amplifier 74, the output of which is connected to an input of the microcontroller 56. An input of the transducer 72 is connected to the output of a transmitter amplifier 76 which in turn is connected to an output of the microcontroller 56.

A suitable transducer 72 would, for instance, be one designed in accordance with the instructions set out in the journal "Ultrasonic" 1989 Vol 27 July pp 234–239 the content of which is incorporated herein by reference. A suitable transmission/reception frequency for the transducer 72 is 40 kHz.

The receiver amplifier 74 also comprises a bandpass noise filter (not shown) designed and configured to allow signals to pass substantially only within the range 30 kHz to 50 kHz (or whatever frequency range is suitable given the transmission frequency). Its design and construction is well within the common general knowledge of a person skilled in the art.

Also shown in FIG. 3 is a charger 78 together with means 80 to link the charger to the charging circuit 50.

The power switch 54 is actuated by slider reed switch 12. The finder switch 58 is actuated by Hall effect slider switch 14. The alert switch 60 is also actuated by the slider switch 14 in a manner to be described in more detail below. The emergency switch 62 is actuated by the switches 16 in a manner to be described in more detail below.

The means 80 linking the charging circuit 50 to the charger 78 comprise the charging point 18 together with electrical coupling means on the charger 78. Typically, the charging point 18 will provide a generally waterproof cover to the charging circuit 50 through which connection can be made by the charger 78 using the link means 80.

The beacon 22 is located within the transparent or translucent section 8 of the casing 4. The sounder 70 is located inside the casing 4 against a convenient part of a wall of the casing 4 in order for its audio signals to be transmitted from the casing at a suitable audible frequency and volume underwater.

The transducer 72 is located beneath the shaped part 20 of the casing 4 such that its vibratory elements are either directly or indirectly in contact with the shaped part 20.

The method of operation of the communication apparatus 2 will now be described with reference to FIGS. 1–4 of the drawings. First the functional operation of the apparatus 2 will be described, followed by details of how the functions are achieved by the apparatus 2.

Functional Operation

The apparatus 2 is switched ON (or OFF) using the slider switch 12. The casing 4 around the switch 12 will either be coloured or include wording to indicate clearly the ON/OFF status of the apparatus 2. Once switched ON, the apparatus 2 is monitoring incoming signals (discussed below) but if no signals are received it will not normally disturb the diver. For the purpose of this explanation it will be assumed that all apparatus 2 referred to are ON.

During normal usage, the apparatus will only emit a noise if the battery is low.

There are, however, three options for the diver to use: alert, emergency or finder modes.

The "alert" mode is actuated by slider switch 14 being moved to one side.

Upon actuation of the "alert" mode, a confirmation tone is transmitted by the sounder 70. Then a predetermined alert code signal is transmitted at an ultra acoustic frequency (say 40 kHz) by the transducer 72. The alert code will be preceded by an address signal generated from addressing information determined by the positions of switches 24, 26, 28, 30.

Upon receipt by similar apparatus 2 of the alert code signal, preceded by the address signal, the receiving apparatus 2 checks whether the address signal information corresponds to its own address configuration and, if so, sounds an alert tone using sounder 70. In this situation, the "buddy" of one diver can be alerted that the other diver wants to gain his (or her) attention.

The second mode of operation is that of "emergency". The "emergency" mode is activated by the diver pressing the two switches 16 on opposite sides of the casing 4. Thus, the "emergency" mode can be actuated by the diver making a gripping motion around the casing 4 which is a natural movement in an emergency. However, because two switches 16 need to be actuated, the chances of accidental activation are minimal.

In this case, upon activation, an emergency code signal is transmitted by transducer 72. A tone is emitted by the diver's apparatus 2 to confirm emission of the emergency code signal. Also, the beacon 22 is flashed to assist in the location of the diver transmitting the emergency code signal. The program pauses in a "sleep" mode to save battery power until any signal is received. The program will "restart" or "awaken" to investigate any received signal. The apparatus 2 then monitors whether a "finder" signal has been received (see below) and, if not, repeats the transmission of the emergency code. Occasionally, the beacon 22 is flashed and the tone confirming that the apparatus 2 is still in its "emergency" mode is reemitted.

An apparatus 2 upon receiving an emergency signal will immediately emit a distinctive tone sequence to alert its user to the situation. The emergency signal is acted upon by all receiving apparatus 2 regardless of their address configurations.

The "finder" mode can be used to find a diver who has transmitted the emergency code signal.

The "finder" mode is activated by slider switch 14 being moved to one side, opposite to the side for the "alert" mode.

In this "finder" mode, a finder code signal is transmitted by the transducer 72. Any apparatus 2 in an "emergency" mode will, upon receipt of the finder signal transmit a locator code signal from its transducer 72.

The transmitter of a finder signal will, upon receipt of the locator signal determine whether it is closer to, further from or the same distance away from the diver in an emergency and emit an appropriate series of tones to inform its user. If the searching diver is further away from the apparatus 2 in "emergency" mode the sounder 70 emits a medium tone followed by a low tone. If the diver is the same distance away two medium tones are emitted. If the diver is nearer a medium tone is emitted followed by a high tone. In this way a searching diver can home in on a diver in an emergency. The occasional flashing of the beacon 22 of the apparatus 2 of the diver in an emergency also helps the tracking procedure, especially during the last few meters.

Figure 4A:
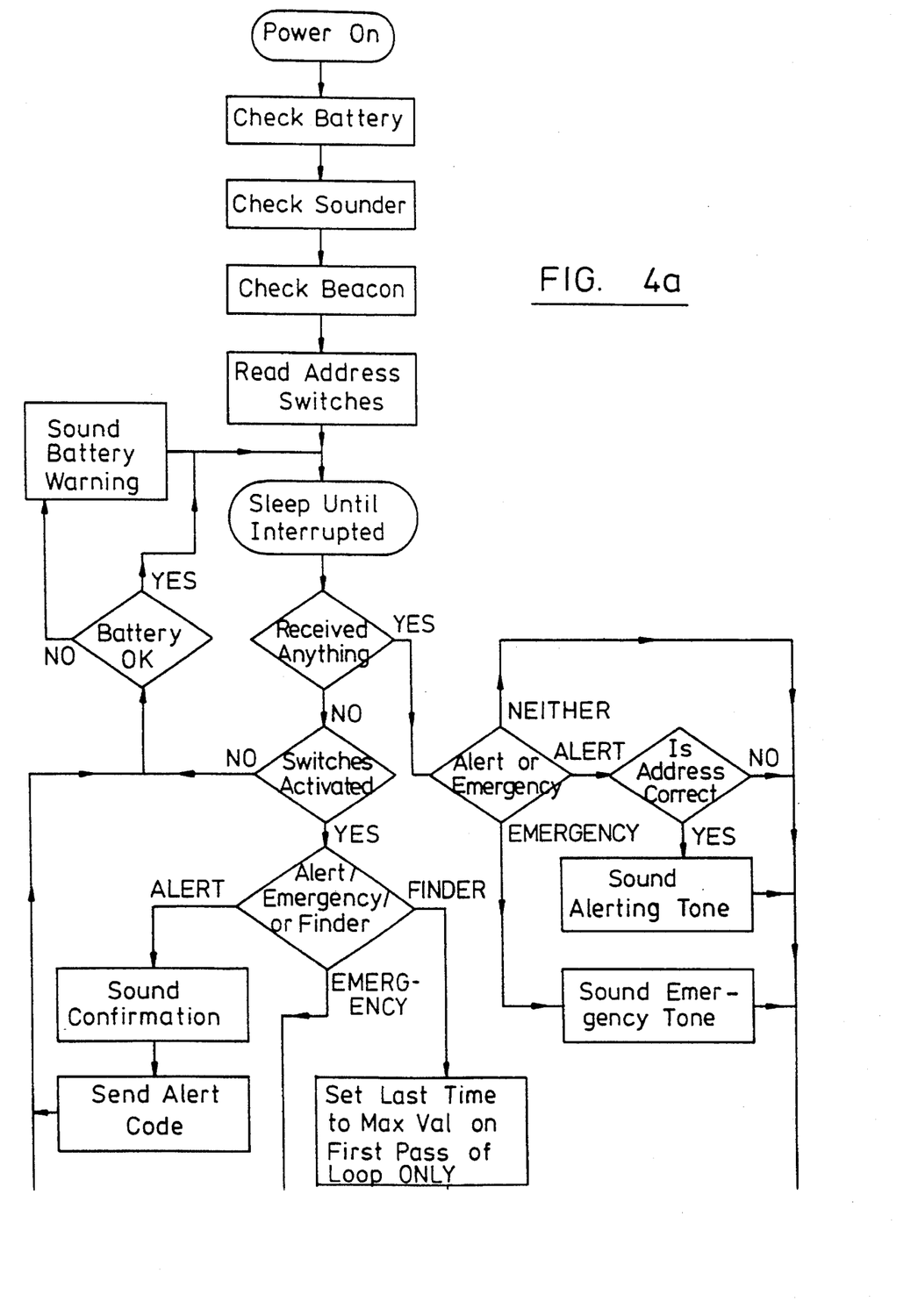
FIG. 4a and 4b are a software block diagram illustrating the method of operation of the microcontroller shown in FIG. 3.
Figure 4B:
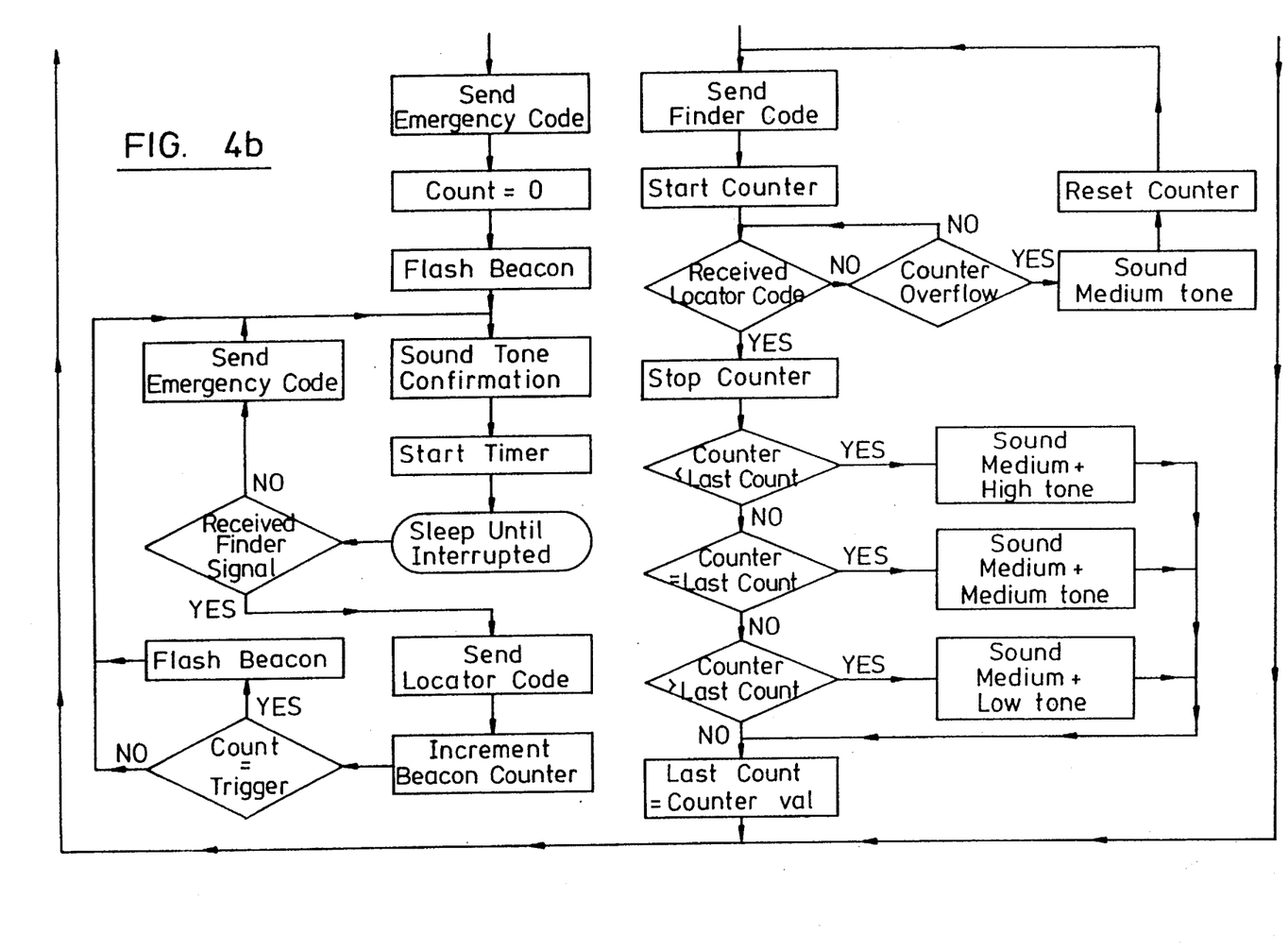

In order now to explain the operation of the system which achieves the functions referred to above, the block diagram shown in FIG. 4 will be explained step-by-step.

Standard Operation

"Power on" is accomplished by movement of the slider switch 12 from its OFF position to its ON position. When the slider switch 12 is moved to its ON position, the power switch 54 is made, enabling power to flow to the system from the rechargeable battery 52.

A "check battery" routine in the microcontroller 56 determines the voltage across the rechargeable battery 52.

A "check sounder" routine runs a diagnostic check on the sounder 70. A "check beacon" routine runs a diagnostic check on the beacon 66.

Next, at "read address switches" each of the switches 24, 26, 28, 30 are read. It will be appreciated that with four binary Hall effect switches 24, 26, 28, 30 there are sixteen possible addressing permutations. In order to communicate, a pair of divers will use the communication apparatus 2 with their respective address switches 24, 26, 28, 30 in the same positions. It is anticipated that the sixteen unique addressing possibilities will be sufficient to enable a conventional number of divers to dive in an area without units being mis-addressed. However, if that proves not to be the case, the apparatus 2 can easily be modified to provide another address switch to give an extra sixteen addressing permutations.

The unit will enter a low power consumption "sleep" mode until a signal is received or a switch is activated. Once the microcontroller 56 leaves "sleep" mode at "received anything?", a check to determine whether any valid incoming signals have been received.

Assuming that no signals have been received, the unit then, at "switches activated?" reads the status of switches 14 and 16. If no switches have been activated a "battery OK?" diagnostic is run which checks the actual voltage across the battery with a predetermined tolerance range and, if out side that range, "sound battery warning" causes the audio sounder 70 to emit an appropriate tone. Otherwise, the apparatus 2 moves back to the "sleep until interrupted" stage waiting for signals to be received or switches to be activated.

"Alert" Mode

If any switches have been activated, at "alert, emergency or finder?" the microcontroller 56 determines which switch has been actuated and initiates the appropriate sub-routine.

If switch 14 has been moved to its "alert mode" position, at "sound confirmation" the apparatus 2 emits a tone through audio sounder 70 and then "send alert code" causes the transmission from transducer 72 of an ultra acoustic alert code signal; preceded by an address code signal determined by the position of switches 24, 26, 28, 30.

"Emergency" Mode

If the switches 16 have been actuated the microcontroller 56 enters its "emergency" mode sub-routine from "alert, emergency or finder?" as referred to above.

At "send emergency code" the transducer 72 is caused to transmit a predetermined ultra acoustic emergency code signal. Next a count register is set to zero at "count equals zero" and the beacon 22 flashed at "flash beacon" The audio sounder 70 emits a tone to confirm the activation of the emergency mode at "sound tone confirmation" following which, at "start timer" the timer is initiated which is run from a clock pulse generated by the microcontroller 56.

At "sleep until interrupted" the apparatus 2 waits a predetermined time unless a finder signal is received at "received finder signal?" If a finder signal is received, a locator code signal is transmitted at "send locator code" and a beacon counter incremented at "increment beacon counter" This is the counter referred to above which is preset to zero at "count equals zero". If the counter is equal to a predetermined TRIGGER value (which will be dependent on amongst other things, the clock speed) then, at "count equals trigger?" the beacon is flashed again at "flash beacon". Otherwise, the sub-routine returns to the "sound tone confirmation" stage.

Referring back to the "sleep until interrupted" stage, if, after the predetermined delay, no finder signal has been received at "received finder signal?" the emergency code is re-transmitted at "send emergency code" and the routine, again, returns to "sound tone confirmation".

The "emergency mode" can only be deactivated by turning the apparatus 2 to OFF using switch 12.

"Finder" Mode

If the finder switch 14 is actuated then at "alert, emergency or finder?" the appropriate "finder" branch is selected and corresponding sub-routine actuated.

During the first pass of the loop only a LAST TIME counter is set to a predetermined maximum value at "set LAST TIME to MAX VAL on first pass of loop only". Next, at "send finder code" the transducer 72 is controlled to transmit an ultra acoustic finder code signal. At "start counter" the counter is started. If, at "received locator code?" the apparatus 2 has received a locator code from the apparatus 2 in "emergency" mode then the counter started at "start counter" is stopped at "stop counter".

The microcontroller 56 then compares the counter value with the LAST TIME value, which during the first pass only will be set to the predetermined maximum value. The counter measures the number of clock pulses emitted during a given time by a sub-unit of the microcontroller 56.

If the counter value is less than the LAST TIME value then, at "counter<last count?" The microcontroller moves to "sound medium & high tone" and does so. If the counter value is equal to the LAST TIME value then, at "counter= last count?" The routine moves to "sound medium & medium tone" and does so. If the counter value is greater than the LAST TIME value then at "counter>last count?"

The routine moves to "sound medium & low tone" and does so. Thus, as explained above, an audible indication is given of whether the searching diver is getting nearer to, further away from or at about the same distance from the diver in an emergency situation. Note that for the "counter=last count?" analysis, there can be a predetermined range variation allowed from absolute equality which may not, in effect, indicate whether the diver is getting nearer or further away so the medium and medium tones would be emitted in this circumstance.

After comparing the counter value to the LAST TIME value the LAST TIME value is set to the current counter value and the counter reset to zero at "last count equals counter val" The microcontroller 56 then returns to the "battery OK?" routine.

If at "receive locator code?" no locator signal has been received, a "counter overflow?" test is carried out and if the counter register has not overflowed the sub-routine returns to "received locator code?" If the counter has overflowed at "counter overflow?" then the audio sounder 70 is caused to emit a single medium tone at "sound medium tone", the counter is reset at "reset counter" and the routine returns to transmit another finder signal at "send finder code" as described above.

Referring now to the "received anything?" part of the block diagram referred to above, if a signal is received, then at "alert or emergency?" the microcontroller 56 determines whether it is an alert signal or an emergency code signal. If, however, it is a finder code signal or any other signal no action is taken in this part of the algorithm.

If an alert code signal is received the microcontroller 56 at "is address correct?" compares the addressing signal preceding the incoming alert code signal with its own addressing switch status and, if identical, sounds a tone using audio sounder 70 to alert the diver at "sound alerting tone" and returns to the "battery OK?" routine.

If, however, the address is not identical then the apparatus 2 ignores the signal, no tone is sounded and the "battery OK?" routine is returned to immediately.

If an emergency code signal is received then a distinct emergency tone is emitted by audio sounder 70 at "sound emergency tone" and the apparatus returns to "battery OK?" The diver, upon hearing the distinct emergency tone would be expected to switch to "finder" mode as described above. Note that there is no check of the address status in this case. All apparatus 2 respond to any emergency code signal received.

Thus, the embodiment of the invention described above provides a communication apparatus for diver to diver communication, the apparatus comprising a waterproof casing, power supply means, ultra acoustic transmission means, ultra acoustic reception means, control means for the ultra acoustic transmissions, monitoring means for the ultra acoustic reception, and means to actuate the transmission means; whereby upon actuation of the transmission means a predetermined signal is transmitted by the transmission means suitable for reception by the reception means of another diver using similar apparatus.

As an alternative to the embodiment described above, it is preferred that the addressing of the apparatus be controlled and programmable by a datastream supplied through the power charger.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment (s) . The invention extends to any novel one, or any novel combination, of the features disclosed in this specification ( including any accompanying claims, abstract and drawings ), or to any novel one, or any novel combination, of the steps of any method or process so disclosed.

I claim:

1. A communication apparatus for diver to diver communication, the apparatus comprising a waterproof casing, power supply means, ultra acoustic transmission means comprising a transducer, control means for the ultra acoustic transmissions, means to actuate the ultra acoustic transmission transducer, ultra acoustic reception means comprising a transducer, monitoring means for the ultra acoustic reception of ultra acoustic waves transmitted by another diver using a similar apparatus, and at least one of the ultra acoustic transmission transducer and the ultra acoustic reception transducer is located in a shaped casing having a generally hemicylindrical curved surface in order, with respect to the transmission transducer, to refract the ultra acoustic waves transmitted to another diver using a similar apparatus, and, with respect to the reception transducer, to refract the ultra acoustic waves transmitted by another diver using a similar apparatus; whereby upon actuation of the ultra acoustic transmission transducer a predetermined signal is transmitted by the ultra acoustic transmission transducer suitable for reception by the reception means of the similar apparatus used by the other diver.

2. A communication apparatus according to claim 1, in which the waterproof casing encloses the other parts of the apparatus.

3. A communication apparatus according to claim 1, in which the predetermined signal is one of a plurality of possible predetermined signals.

4. A communication apparatus according to claim 1, in which the communication apparatus comprises an attention mode in which a predetermined ultra acoustic attention signal is transmitted, which attention signal upon receipt by a similar communication apparatus results in the production of an alert attention signal.

5. A communication apparatus according to claim 4, in which the attention alert signal is an audio signal.

6. A communication apparatus according to claim 4, in which the attention signal is only responded to by an appropriately addressed similar apparatus.

7. A communication apparatus according to claim 6, in which the attention signal is accompanied by an addressing signal.

8. A communication apparatus according to claim 7, in which the attention signal is preceded by the addressing signal.

9. A communication apparatus according to claim 7, in which the apparatus further comprises means for changing the addressing signal of the apparatus.

10. A communication apparatus according to claim 9, in which the attention signal is only responded to by a similar apparatus addressed in the same way.

11. A communication apparatus according to claim 1, in which means are provided for emitting an ultra acoustic emergency signal which is responded to by all similar apparatus.

12. A communication apparatus according to claim 11, in which a visible distress signal, is used in conjunction with the ultra acoustic emergency signal.

13. A communication apparatus according to claim 11, which the emergency signal requires the actuation of two distinct switches for activation.

14. A communication apparatus according to claim 13, in which manual actuation of two distinct switches is required.

15. A communication apparatus according claim 1, in which the apparatus further comprises means for transmitting an ultra acoustic finder signal which finder signal is responded to by a similar apparatus by the emission of an ultra acoustic locator signal.

16. A communication apparatus according to claim 15, in which the apparatus further comprises measuring means to determine whether the apparatus is nearer to the transmitted locator signal in relation to its distance determined from a previously received locator signal.

17. A communication apparatus according to claim 16, in which the measuring means comprises means to generate a clock pulse, means to measure the number of clock pulses between the transmission of a finder signal and the receipt of a locator signal, means to calculate whether the number of clock pulses in less than, the same as or more than the number of clock pulses measured during the previous cycle of finder signal transmission and locator signal transmission and means to communicate the results.

18. A communication apparatus according to claim 17, in which the communication means comprises an audio sounder.

19. A communication apparatus according to claim 1, in which the power supply means comprises a rechargeable battery.

20. A communication apparatus according to claim 19, in which that is further provided means to recharge the battery in situ from an external source.

21. A communication apparatus according to claim 1, in which apparatus further comprises means to attach the apparatus to a diver.

22. A communication apparatus according to claim 1, in which the switches of the apparatus comprise Hall effect switches which do not require the integrity of the casing to be compromised.

* * * * *